UNITED STATES PATENT OFFICE.

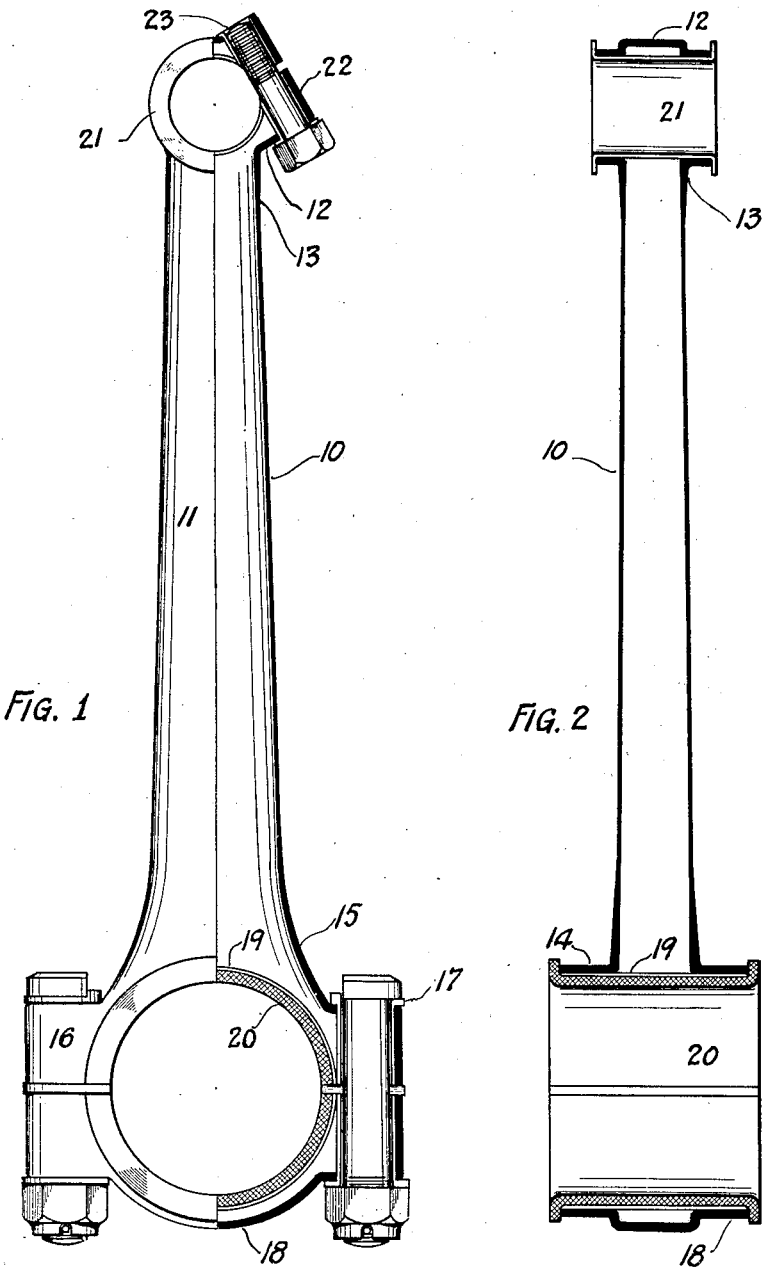

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,340,171.   Specification of Letters Patent.   Patented May 18, 1920.

Application filed March 26, 1918. Serial No. 224,758.

*To all whom it may concern:*

Be it known that I, HEBRON BERNARD LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, pitman rods, links, levers and the like, when fashioned from thin material, generally tubing or sheet metal—ferrous or non-ferrous—whether of many pieces or one piece, and whether joined or jointless.

An object of the invention is to provide a connecting rod, or the like, which shall be of extremely light weight, and consisting of the fewest parts possible. This is accomplished by the provision of a shell, preferably a unitary shell, the wall of which is of varying or tapering thickness, allowing the use of thicker material in the more heavily stressed portions of the shell, thinner material in the lightly stressed portion or portions, and material of tapering thickness, joining the thicker and thinner sections.

Other objects will appear hereafter in the specification and claims, clearly discernible to those skilled in this art.

In the accompanying drawing, by way of example only, the invention is shown as applied to the one-piece, jointless, hollow connecting rod shell, which is the subject of my co-pending application, Serial No. 91566, filed April 17th, 1916, and the rod of this present invention as shown, is fabricated entirely and solely by the process fully described and shown in my co-pending application, Serial No. 93052, filed April 24th, 1916, entitled "Method of making connecting rods."

The invention may, with equal facility, be applied to other forms of connecting rods fashioned from relatively thin material, for example the rods disclosed in my co-pending applications, Serial Numbers—

157,273 filed March 24th, 1917,
161,399   "   April 12th,   "
161,729   "   April 13th,   "
162,727   "   April 17th,   "

or to those rods which are the subject matter of the United States Patents issued to me Nos. 1,176,300, 1,176,302, 1,218,572 and 1,226,978.

Figure 1 is a side elevation, half in section, of a connecting rod, having a one-piece sheet metal shell, embodying the feature of the invention;

Fig. 2 is a section at right angles of the rod in Fig. 1.

10 is the shell of the connecting rod, comprising a central shank portion 11 of relatively thin material, a piston end portion 12 of heavier or thicker material, which connects with the shank portion by a tapering section as shown at 13. Similarly, the crank end portion 14 is joined to the shank by a tapering section as shown at 15. This end is provided with integral bolt bosses 16, which are fitted with lining sleeves 17. The rod has a cap 18, which, as described in my co-pending applications, Serial Nos, 91566 and 93052, is originally formed integral with the shell, and subsequently cut therefrom. The crank pin aperture of the crank end portion is lined with a metal bushing 19, which in turn is faced with Babbitt or other bearing metal 20. Similarly, the piston pin aperture is lined with a flange bushing 21, and provided with an integral pinch bolt boss 22, which in turn is provided with a threaded sleeve lining 23.

In my application entitled "Method of making connecting rods," previously referred to, Serial No. 93052, I have, at great length, described and shown all of the steps of the process of making the connecting rod of this present invention.

Heretofore, I have used the word "shell" in referring to the main part of the connecting rod. By "shell" I mean the shank portion and one or both end portions integral therewith, exclusive of cap or flanged bushings, or liner bushing, or bolt boss bushings, or shank reinforcement, or similar small parts. My use of the word "shell" will apply with equal force to connecting rods with or without caps.

Where I use the term "sheet metal" hereinafter in the claims, I wish it understood that I mean any form of metal which partakes of the nature and characteristics of sheet metal, as distinguished from castings and forgings.

As distinguished from the present invention, in which the rod shell has end portions of greater wall thickness than the shank portion, I have described and claimed in my co-pending application No. 224,759 a connecting rod shell having an end portion or end portions of lesser wall thickness than the shank portion, and in my co-pending application No. 224,760, I have described and claimed a connecting rod shell with one end portion of greater and one of lesser wall thickness than the shank portion.

Having fully described my invention, what I claim as new and desire to secure by Letters Patent, is:—

1. A sheet metal connecting rod shell, with an end portion of greater thickness than the shank portion.

2. A sheet metal connecting rod shell, with end portions of greater thickness than the intermediate portion.

3. A one-piece sheet metal connecting rod shell, with an end portion of greater thickness than the shank portion.

4. A sheet metal connecting rod shell with an end portion of relatively thick material, and a shank section of relatively thin material, connected by a section of tapering thickness.

5. A connecting rod shell, comprising a sheet metal shank portion and two head portions; the said shank portion and a part of one head portion being integral but of different thickness of metal.

6. A connecting rod shell comprising a sheet metal shank portion and two head portions, one of said head portions and a part of the other head portion being integral and of different thickness metal than the shank portion.

7. A connecting rod shell comprising a sheet metal hollow shank portion and two head portions; a part of one of the said head portions being integral with the shank portion and of thicker metal.

8. A connecting rod shell of sheet metal of various thicknesses.

9. A one piece connecting rod shell of sheet metal of various thicknesses.

10. A sheet metal connecting rod shell, the wall of which is comparatively thick in the head ends and thin in a region distant from the ends.

11. A sheet metal connecting rod shell, the shank of which increases in wall thickness toward the piston end.

12. A sheet metal connecting rod shell, the shank of which increases in wall thickness toward the crank end.

13. A sheet metal connecting rod shell, the shank of which increases in wall thickness toward both ends.

14. A sheet metal connecting rod shell with a shank portion, the wall of which tapers in thickness from both ends.

15. A sheet metal connecting rod shell with a shank portion, the wall of which increases in thickness toward one end.

16. A sheet metal connecting rod shell, the wall of which varies substantially in thickness.

17. A hollow one piece drawn sheet metal connecting rod shell, the wall of which is of varying thickness.

18. A connecting rod shell of sheet metal of varying thickness.

19. A one piece connecting rod shell of sheet metal of varying thickness.

HEBRON BERNARD LAYMAN.

Witnesses:
L. D. WISE,
M. C. MEYER.